(12) United States Patent
Yu et al.

(10) Patent No.: US 11,644,061 B2
(45) Date of Patent: May 9, 2023

(54) MOUNTING AND DISMOUNTING NUT STRUCTURE

(71) Applicant: Xiamen Lota International Co., Ltd., Fujian (CN)

(72) Inventors: Dezheng Yu, Fujian (CN); Yuzheng Wu, Fujian (CN); Qingshui Ma, Fujian (CN); Huosheng Zhan, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 216 days.

(21) Appl. No.: 15/930,503

(22) Filed: May 13, 2020

(65) Prior Publication Data
US 2020/0362905 A1  Nov. 19, 2020

(30) Foreign Application Priority Data

May 15, 2019 (CN) .......................... 201910402413.5

(51) Int. Cl.
| | |
|---|---|
| *F16B 39/36* | (2006.01) |
| *F16B 39/12* | (2006.01) |
| *F16B 37/08* | (2006.01) |
| *F16B 39/18* | (2006.01) |
| *F16B 37/14* | (2006.01) |

(52) U.S. Cl.
CPC ........ *F16B 39/126* (2013.01); *F16B 37/0864* (2013.01); *F16B 39/122* (2013.01); *F16B 39/18* (2013.01); *F16B 37/145* (2013.01)

(58) Field of Classification Search
CPC ...... E03C 1/0401; F16B 39/126; F16B 39/18; F16B 39/122; F16B 37/145; F16B 37/0864; F16B 37/08

USPC ......... 411/222, 432, 433, 266–268, 270, 272
See application file for complete search history.

(56) References Cited

U.S. PATENT DOCUMENTS

| | | | | |
|---|---|---|---|---|
| 3,352,341 | A * | 11/1967 | Schertz | F16B 37/0864 411/270 |
| 5,118,237 | A * | 6/1992 | Wright | F16B 37/0864 411/14 |
| 5,749,691 | A * | 5/1998 | Campbell | F16B 37/0864 411/270 |
| 5,800,108 | A * | 9/1998 | Cabahug | F16B 37/0857 411/433 |
| 9,222,245 | B2 * | 12/2015 | Ye | E03C 1/04 |
| 10,428,496 | B1 * | 10/2019 | Lu | E03C 1/0403 |

(Continued)

*Primary Examiner* — Gary W Estremsky
(74) *Attorney, Agent, or Firm* — Cooper Legal Group, LLC

(57) ABSTRACT

The present disclosure disclosures a mounting and dismounting nut structure. The mounting and dismounting nut structure comprises a first body, a second body, a plurality of threaded blocks, and a limiting member. Inner walls of the plurality of threaded blocks comprise internal threads, and outer walls of the plurality of threaded blocks comprise second inclined surfaces. When the mounting and dismounting nut structure surrounds the threaded rod and is pushed towards a countertop, the plurality of threaded blocks move toward a center axis of the plurality of threaded blocks, and the second body rotates to drive the plurality of threaded blocks to be locked with the threaded rod. When the plurality of threaded blocks is locked with the threaded rod, the limiting member supports the plurality of threaded blocks in an axial direction of the plurality of threaded blocks.

18 Claims, 11 Drawing Sheets

(56) References Cited

U.S. PATENT DOCUMENTS

| | | | |
|---|---|---|---|
| 2005/0238460 A1* | 10/2005 | Li | F16B 37/0864 |
| | | | 411/432 |
| 2014/0182708 A1* | 7/2014 | Ye | E03C 1/0401 |
| | | | 137/315.01 |
| 2019/0071848 A1* | 3/2019 | Darocha | E03C 1/0401 |
| 2020/0040932 A1* | 2/2020 | Zhou | F16B 37/0864 |
| 2021/0254653 A1* | 8/2021 | Nakaya | F16B 37/0828 |

\* cited by examiner

MOUNTING AND DISMOUNTING NUT STRUCTURE

RELATED APPLICATIONS

This application claims priority to Chinese Patent Application 201910402413.5, filed on May 15, 2019. Chinese Patent Application 201910402413.5, is incorporated herein by reference.

FIELD OF THE DISCLOSURE

The present disclosure relates to a mounting and dismounting nut structure.

BACKGROUND OF THE DISCLOSURE

At present, the kitchen faucet is mainly installed near the wall and is limited by the shape of a sink. The space for locking the kitchen faucet under the countertop is very small, and most of the kitchen faucets are fixed to sinks by a threaded connection. According to a current locking operation using a nut and a screw, the nut must be rotated from a lower end of the screw. The different thicknesses of the counters determine the effective length of the screw, which determines the length that the nut must be screwed. The space under the countertop is quite small, and the operation space is therefore limited. There is a problem because screwing the nut is time consuming and laborious.

In view of this, a quick assembly and quick release nut came into being. Although the nut can realize quick assembly and quick release, a push cover of a body of the assembly and a threaded block of the assembly are contacted by a first inclined surface and a second inclined surface. If the push cover is slightly retracted during installation, the threaded block will move outward, and a clamping force between the threaded block and a pipe joint of the kitchen faucet will be lost, resulting in the installation being unreliable or even failing.

BRIEF SUMMARY OF THE DISCLOSURE

The present disclosure provides a mounting and dismounting nut structure intended to solve deficiencies of the existing techniques.

In order to solve the aforementioned technical problems, a technical solution of the present disclosure is as follows.

A mounting and dismounting nut structure configured to be screwed to a threaded rod is provided. The mounting and dismounting nut structure comprises a first body comprising a first inclined surface, a second body configured to move relative to the first body and comprising a through hole, a plurality of threaded blocks, and a limiting member. Inner walls of the plurality of threaded blocks comprise internal threads, and outer walls of the plurality of threaded blocks comprise second inclined surfaces. When the mounting and dismounting nut structure surrounds the threaded rod and is pushed towards a countertop, the plurality of threaded blocks move toward a center axis of the plurality of threaded blocks due to cooperation of the first inclined surface and the second inclined surface, and the second body rotates to drive the plurality of threaded blocks to be locked with the threaded rod. When the plurality of threaded blocks is locked with the threaded rod, the limiting member supports the plurality of threaded blocks in an axial direction of the plurality of threaded blocks.

In a preferred embodiment, the limiting member is disposed below the plurality of threaded blocks.

In a preferred embodiment, the limiting member is operatively connected to the second body or the first body.

In a preferred embodiment, the limiting member comprises a hollow sleeve ring, and an inner wall of the hollow sleeve ring comprises a drive surface. The second body comprises a first drive block configured to be operatively connected to the drive surface. An inner wall of the first body is operatively connected to the hollow sleeve ring, and the second body rotates to drive the limiting member to rotate and move upward. When the limiting member rotates and moves upward to a preset position, the limiting member drives the first body to rotate.

In a preferred embodiment, the inner wall of the hollow sleeve ring comprises a step surface, and the step surface divides the inner wall of the hollow sleeve ring into a first inner wall and a second inner wall. A size of the first inner wall is larger than a size of the second inner wall. The first drive block is configured to move in the first inner wall in an axial direction of the first drive block, and the first inner wall is the drive surface. When the step surface abuts a bottom end surface of the first drive block, the hollow sleeve ring is configured to rotate to drive the first body to rotate.

In a preferred embodiment, an outer wall of the hollow sleeve ring is operatively screwed to the inner wall of the first body.

In a preferred embodiment, a limit on upward movement of the second body is the same as a limit on upward movement of the limiting member.

In a preferred embodiment, the first body further comprises a second limiting surface configured to limit movement of the hollow sleeve ring in an axial direction of the hollow sleeve ring.

In a preferred embodiment, the first body further comprises an activity chamber. The limiting member is fixedly disposed in the activity chamber, and the limiting member faces the plurality of threaded blocks.

In a preferred embodiment, the limiting member comprises a limiting protrusion, a third limiting surface, and a fourth limiting surface connected one-to-one, and the third limiting surface is higher than the fourth limiting surface. The second body comprises a second drive block extending outward. When the second drive block is connected to the fourth limiting surface, the second body is configured to move relative to the first body in an axial direction of the second body. When the second body rotates to enable the second drive block to be connected to the third limiting surface so as to support the plurality of threaded blocks in an axial direction of the second drive block, the second body continuously rotates to push the second drive block to abut the limiting protrusion to drive the first body and the plurality of threaded blocks to rotate concurrently.

In a preferred embodiment, the limiting member further comprises a transition surface, and the transition surface is connected between the third limiting surface and the fourth limiting surface.

In a preferred embodiment, the first body comprises a first upper body and a first lower body connected to the first upper body, and an activity chamber is disposed between the first upper body and the first lower body. The first inclined surface is disposed on an inner surface of the first upper body, and the limiting member is disposed below the first inclined surface.

In a preferred embodiment, the first upper body is connected to the first lower body by screwing, welding, sticking, clamping, or screwing with loosening protective teeth.

Compared with existing techniques, the technical solution provided by the present disclosure has the following advantages.

1. As the mounting and dismounting nut structure comprises a limiting member in the activity chamber, when the plurality of threaded blocks is locked with the threaded rod, the limiting member supports the plurality of threaded blocks in an axial direction of the plurality of threaded blocks. Therefore, an outward movement and a downward movement of the plurality of threaded blocks caused by a looseness of the first body, resulting in a loss of an engagement force with the threaded rod, is avoided. A locking state of the plurality of threaded blocks and the threaded rod can be ensured before the plurality of threaded blocks and the threaded rod are unlocked, so an assembly of the mounting and dismounting nut structure and the threaded rod is more reliable.

2. The limiting member is disposed under the plurality of threaded blocks. When the plurality of threaded blocks is to loosen, the limiting member directly upwardly abuts the plurality of threaded blocks and limits movement of the plurality of threaded blocks is better.

3. The limiting member is operatively connected to the second body or the first body, so the limiting member can not only support the plurality of threaded blocks but also have a drive effect, which can simplify an internal structure of the mounting and dismounting nut structure and make the internal structure of the mounting and dismounting nut structure more compact and small.

4. The second body rotates to drive the limiting member to rotate and move upward. When the limiting member rotates and moves upward to the preset position, the limiting member can drive the first body to rotate. Therefore, the limiting member can move upward relative to the first body only before the limiting member rotates to the preset position. When the limiting member rotates to the preset position, the limiting member drives the first body to rotate. The first body drives the plurality of threaded blocks to rotate so that the plurality of threaded blocks is locked with the threaded rod due to the cooperation of the first inclined surface and the second inclined surface.

5. The first drive block can move in the first inner wall in the axial direction of the first drive block. When the second body moves upward, the first drive block moves upward along the first inner wall until the first drive block moves to the top end of the first inner wall and the threaded diameter of the plurality of threaded blocks defines the standard threaded diameter, which just fits with the threaded rod.

6. The outer wall of the hollow sleeve ring is operatively coupled to the inner wall of the activity chamber, so the hollow sleeve ring can move upward along the activity chamber and can also drive the first body and the plurality of threaded blocks to rotate when the hollow sleeve ring moves upward to the preset position.

7. The limit on upward movement of the second body is the same as the limit on upward movement of the limiting member. After an upward movement of the limiting member is complete, the first drive block abuts the step surface to support the first body in an axial direction of the first body and the plurality of threaded blocks abuts the first body, so the hollow sleeve ring supports the plurality of threaded blocks in an axial direction of the plurality of threaded blocks.

8. When the limiting member abuts the first limiting surface, a highest position where the limiting member is configured to move upward has been obtained. At this time, the limiting member rotates to drive the first body to rotate.

When the limiting member abuts the second limiting surface, a lowest position where the limiting member is configured to move downward has been obtained.

9. The limiting member is fixedly disposed in the activity chamber and faces the plurality of threaded blocks, resulting in the mounting and dismounting nut structure being more compact.

10. The limiting member comprises the limiting protrusion, the third limiting surface, and the fourth limiting surface. In the initial position, when the second drive block cooperates with the fourth limiting surface, the second body can move relative to the first body in an axial direction of the second body. When the second body rotates to drive the second drive block to cooperate with the third limiting surface, the second body can support the plurality of threaded blocks in an axial direction of the plurality of threaded blocks. The second body continuously rotates to push the second drive block to abut the limiting protrusion to drive the first body and the plurality of threaded blocks to rotate concurrently so as to enable the plurality of threaded blocks to be locked with the threaded rod.

11. The transition surface is connected between the third limiting surface and the fourth limiting surface to ensure that the second drive block can smoothly move between the fourth limiting surface and the third limiting surface.

BRIEF DESCRIPTION OF THE DRAWING

The present disclosure will be further described below with the combination of the accompanying drawings and the embodiments.

DETAILED DESCRIPTION OF THE EMBODIMENTS

Embodiment 1

Figure 1:
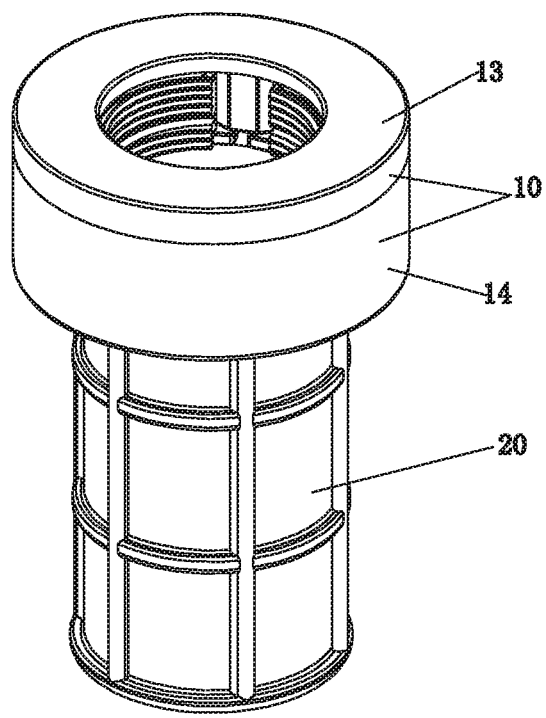
FIG. 1 illustrates a schematic view of an overall of a mounting and dismounting nut structure of Embodiment 1.

Referring to FIGS. 1-5, a mounting and dismounting nut structure of this embodiment is screwed to the threaded rod 1. The mounting and dismounting nut structure comprises a first body 10, a second body 20, a plurality of threaded blocks 30, and a limiting member 40.

The first body 10 comprises an activity chamber 11, and an inner wall of the activity chamber 11 comprises a first inclined surface 12.

Figure 2:
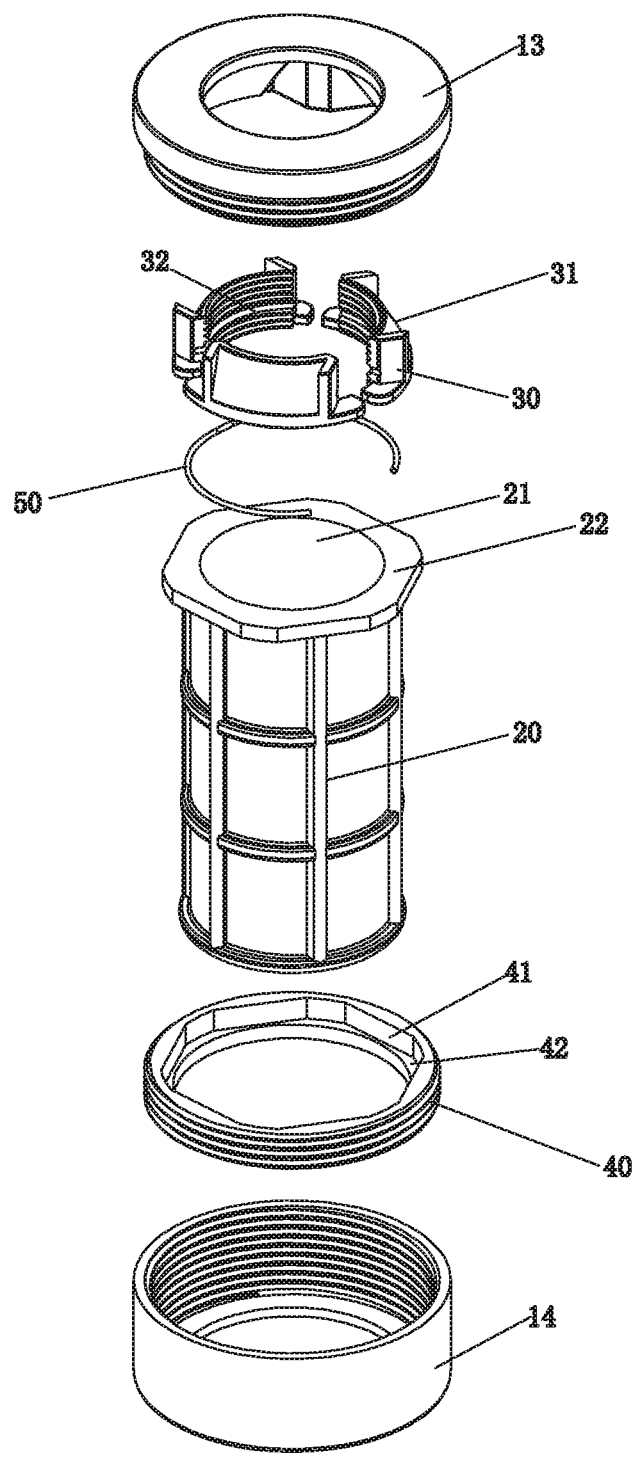
FIG. 2 illustrates an exploded perspective view of the mounting and dismounting nut structure of Embodiment 1.
Figure 3:
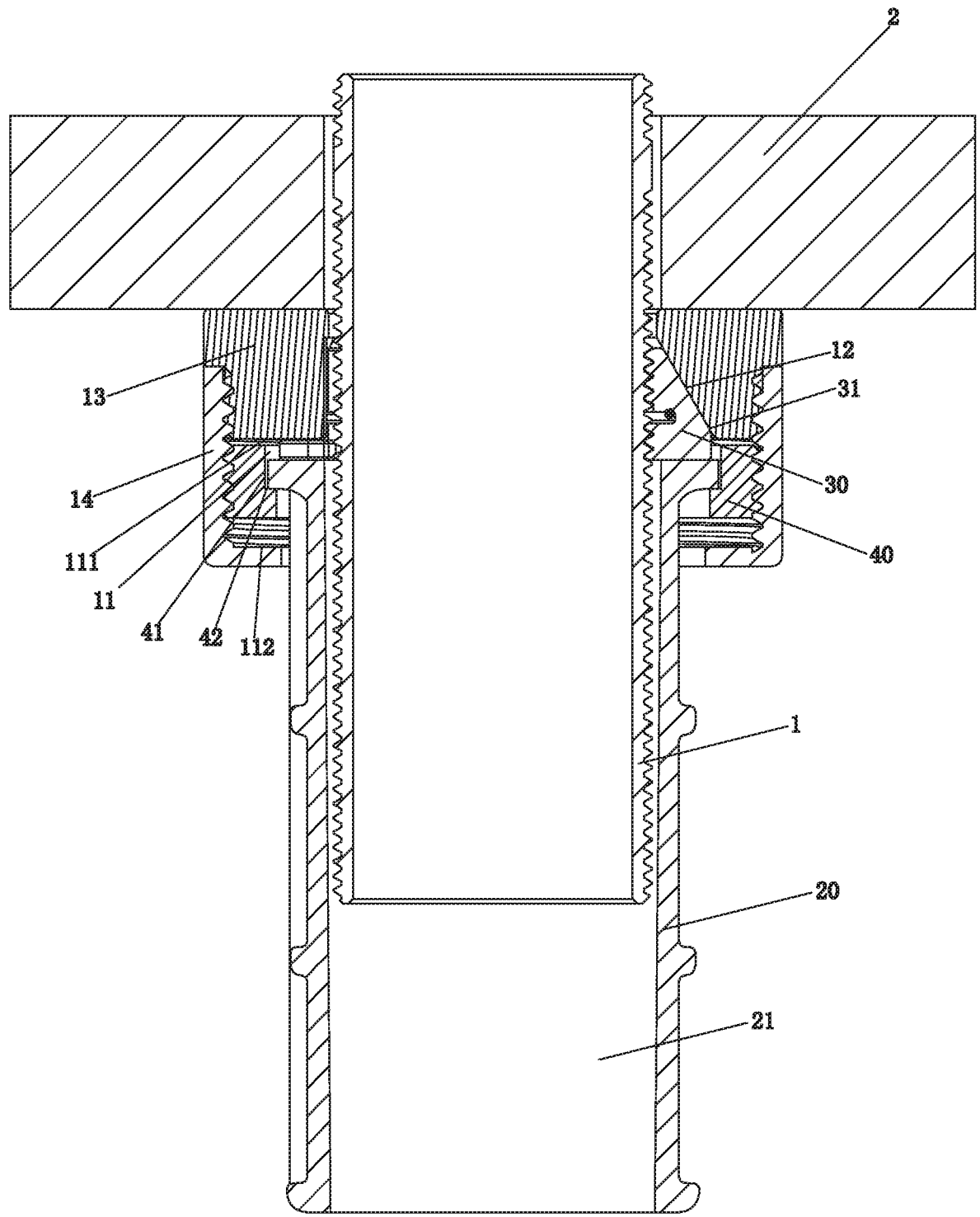
FIG. 3 illustrates a cross-sectional schematic view of the mounting and dismounting nut structure of Embodiment 1 when the mounting and dismounting nut structure and a threaded rod are assembled.

In this embodiment, as shown in FIGS. 2 and 3, the first body 10 comprises a first upper body 13 and a first lower body 14 connected to the first upper body 13. The activity chamber 11 is disposed between the first upper body 13 and the first lower body 14, and the first inclined surface 12 is disposed on an inner wall surface of the first upper body 13. The first upper body 13 is fixedly screwed to the first lower body 14. Alternatively, the first upper body 13 can be connected to the first lower body 14 by welding, gluing, clamping, or screwing with loosening protective teeth to ensure that the first upper body 13 and the first lower body 14 are relatively fixed.

Figure 5:
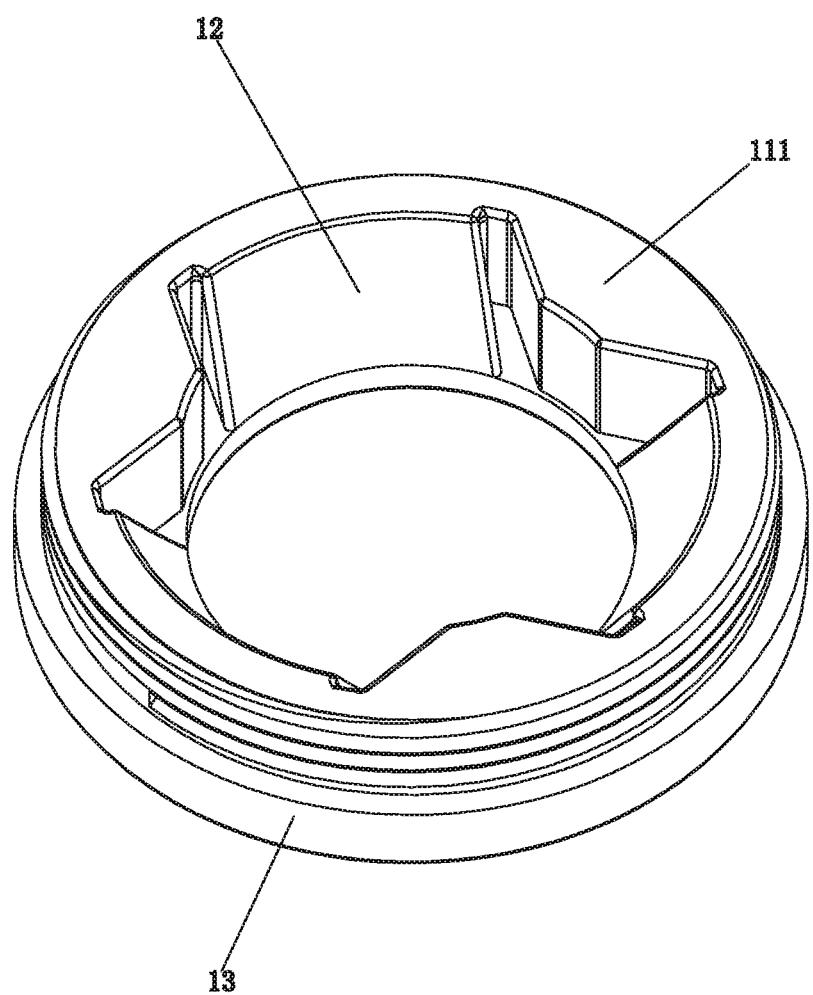
FIG. 5 illustrates a schematic view of a first upper body of Embodiment 1.

As shown in FIG. 5, the inner wall surface of the first upper body 13 comprises three first inclined surfaces 12 disposed at intervals. Two sides of each of the three first inclined surfaces 12 respectively abuts two sides of each of the plurality of threaded blocks 30 so that the first upper body 13 rotates to drive the plurality of threaded blocks 30 to rotate concurrently.

The second body 20 is configured to move relative to the first body 10 in an axial direction and a circumferential direction of the first body 10. The second body 20 comprises a through hole 21 connected to the activity chamber 11.

In this embodiment, a top end of the second body 20 comprises a first drive block 22. As shown in FIG. 2, the first drive block 22 has a hexagonal shape, and the first drive block 22 extends outward along a radial direction of the second body 20.

The plurality of threaded blocks 30 are movable in the activity chamber 11. Inner walls of the plurality of threaded blocks 30 comprise internal threads, and outer walls of the plurality of threaded blocks 30 comprise second inclined surfaces 31 disposed in a vertical direction. As shown in FIG. 2, a number of the plurality of threaded blocks 30 is three. When the three threaded blocks 30 are arranged to define a closed circular ring, a thread diameter of the internal threads of the three threaded blocks 30 form a common thread diameter (e.g., such as specified by a standards body, for example, International Organizational of Standardization (ISO) metric screw threads specifications) configured to be connected to the threaded rod 1. When the three threaded blocks 30 move outward, the thread diameter of the three threaded blocks 30 is larger than an outer diameter of the threaded rod 1 so that the mounting and dismounting nut structure can be separated from the threaded rod 1.

The limiting member 40 is disposed in the activity chamber 11. In this embodiment, the limiting member 40 is disposed below the three first inclined surfaces 12. When the mounting and dismounting nut structure surrounds an outside the threaded rod 1 and is pushed up to abut a countertop 2, the second body 20 moves upward to drive the three threaded blocks 30 to move upward, the three threaded blocks 30 move toward a central axis of the three threaded blocks 30 due to cooperation of the three first inclined surfaces 12 and the second inclined surfaces 31 until the thread diameter of the three threaded blocks 30 define the standard thread diameter, and the second body 20 rotates to drive the first body 10 and the three threaded blocks 30 to rotate so that the three threaded blocks 30 are locked to the threaded rod 1. In addition, when the three threaded blocks 30 are locked to the threaded rod 1, the limiting member 40 supports the three threaded blocks 30 in an axial direction of the three threaded blocks 30.

In this embodiment, the limiting member 40 is disposed below the three threaded blocks 30.

In this embodiment, the limiting member 40 is operatively connected to the second body 20 and the first body 10. The limiting member 40 is configured to be fixed relative to the first body 10. The limiting member 40 is threaded into the first body 10 by a second external thread of the limiting member 40 and a second internal thread of the first body 10, and the limiting member 40 surrounds the second body 20.

In this embodiment, as shown in FIG. 2, the limiting member 40 is a hollow sleeve ring, and an inner wall of the hollow sleeve ring comprises a drive surface 41. An inner wall of the activity chamber 11 is operatively connected to the hollow sleeve ring. The second body 20 rotates to drive the limiting member 40 to rotate and move upward concurrently. When the limiting member 40 rotates and moves upward to a preset position, the limiting member 40 rotates and moves upward to drive the first body 10 to rotate. As shown in FIG. 2, the drive surface 41 has a hexagonal shape, and a height of the drive surface 41 limits movement of the first drive block 22 in axial direction of the first drive block 22.

In this embodiment, the inner wall of the hollow sleeve ring comprises a step surface 42 disposed below the drive surface 41. The step surface 42 divides the inner wall of the hollow sleeve ring into a first inner wall and a second inner wall, and a size of the first inner wall is larger than a size of the second inner wall. The first drive block 22 is configured to move along the first inner wall along the axial direction of the first drive block 22. The first inner wall is the drive surface 41, and when the step surface 42 abuts a bottom end surface of the first drive block 22 (e.g., the bottom end surface of the first drive block 22 defines a first limiting surface), the hollow sleeve ring rotates to drive the first body 10 to rotate. As shown in FIG. 2, the step surface 42 is circular.

In this embodiment, an outer wall of the hollow sleeve ring is operatively screwed to the inner wall of the activity chamber 11.

In this embodiment, the activity chamber 11 further comprises a second limiting surface 112 configured to limit the limiting member 40 in an axial direction of the limiting member 40.

In this embodiment, a limit on the upward movement of the second body 20 is the same as a limit on the upward movement of the limiting member 40. That is, a distance from a first position of the limiting member 40, where a bottom end surface of the limiting member 40 is connected to the second limiting surface 112, to a second position of the limiting member 40, where the step surface 42 abuts the bottom end surface of the first drive block 22, is the same as a distance that the first drive block 22 moves from the step surface 42 to a top end of the drive surface 41.

In this embodiment, as shown in FIG. 2, the mounting and dismounting nut structure further comprises a C-shaped ring 50. Inner sides of the three threaded blocks 30 comprise C-shaped grooves 32 configured to accommodate the C-shaped ring 50.

When the mounting and dismounting nut structure is assembled, the mounting and dismounting nut structure surrounds an outer side of the threaded rod 1, and a top surface of the first upper body 13 abuts a bottom surface of the countertop 2.

Figure 4:
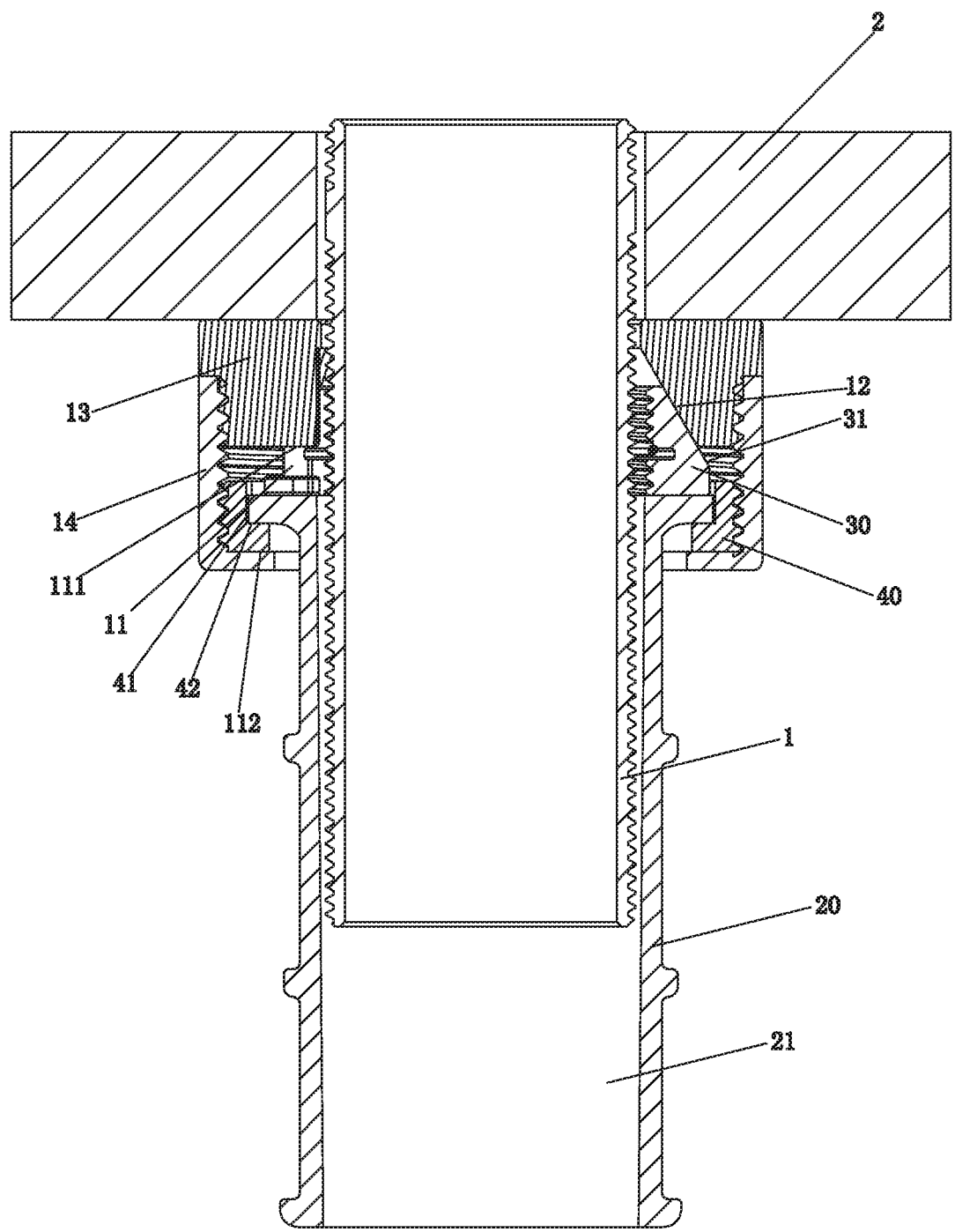
FIG. 4 illustrates a cross-sectional schematic view of the mounting and dismounting nut structure of Embodiment 1 when the mounting and dismounting nut structure can separate from the threaded rod.

As shown in FIG. 4, in an initial state, the first drive block 22 abuts the step surface 42, the hollow sleeve ring abuts the second limiting surface 112, and the three threaded blocks 30 are disposed at intervals.

The second body 20 is pushed upward to drive the three threaded blocks 30 to move upward and inward due to an action of the three first inclined surfaces 12 and the second inclined surfaces 31. When the second body 20 cannot continue to move upward, the first drive block 22 is disposed a top end of the drive surface 41, and the thread diameter of the three threaded blocks 30 is just the standard thread diameter.

The second body 20 rotates clockwise to drive the hollow sleeve ring to rotate concurrently due to cooperation between the drive surface 41 and the first drive block 22, and the hollow sleeve ring moves upward and rotates concurrently until the step surface 42 abuts the bottom end surface of the first drive block 22 (e.g., the hollow sleeve ring rotates relative to the first body 10). The second body 20 continuously rotates to drive the hollow sleeve ring to continue to rotate. At this time, the hollow sleeve ring rotates to drive the first body 10 to rotate concurrently due to an outer side of the hollow sleeve ring being screwed to the inner wall of the activity chamber 11. The first body 10 drives the three threaded blocks 30 to rotate concurrently so that the three threaded blocks 30 are locked with the threaded rod 1. FIG. 3 shows a schematic view when the three threaded blocks 30 are locked with the threaded rod 1.

When the mounting and dismounting nut structure is removed from the threaded rod 1, the second body 20 rotates in a reverse direction (e.g., counterclockwise) to drive the hollow sleeve ring and the first body 10 to rotate in the reverse direction concurrently until the hollow sleeve ring moves to the bottom end surface of the second limiting surface 112. The first drive block 22 also moves downward concurrently, and the three threaded blocks 30 also move downward and outward due to the cooperation of the three first inclined surfaces 12 and the second inclined surfaces 31. The three threaded blocks 30 bounce back due to an action of the C-shaped ring 50, so that the three threaded blocks 30 can be quickly unlocked with the threaded rod 1. At this time, the mounting and dismounting nut structure can be directly removed from the threaded rod 1.

Embodiment 2

Figure 6:
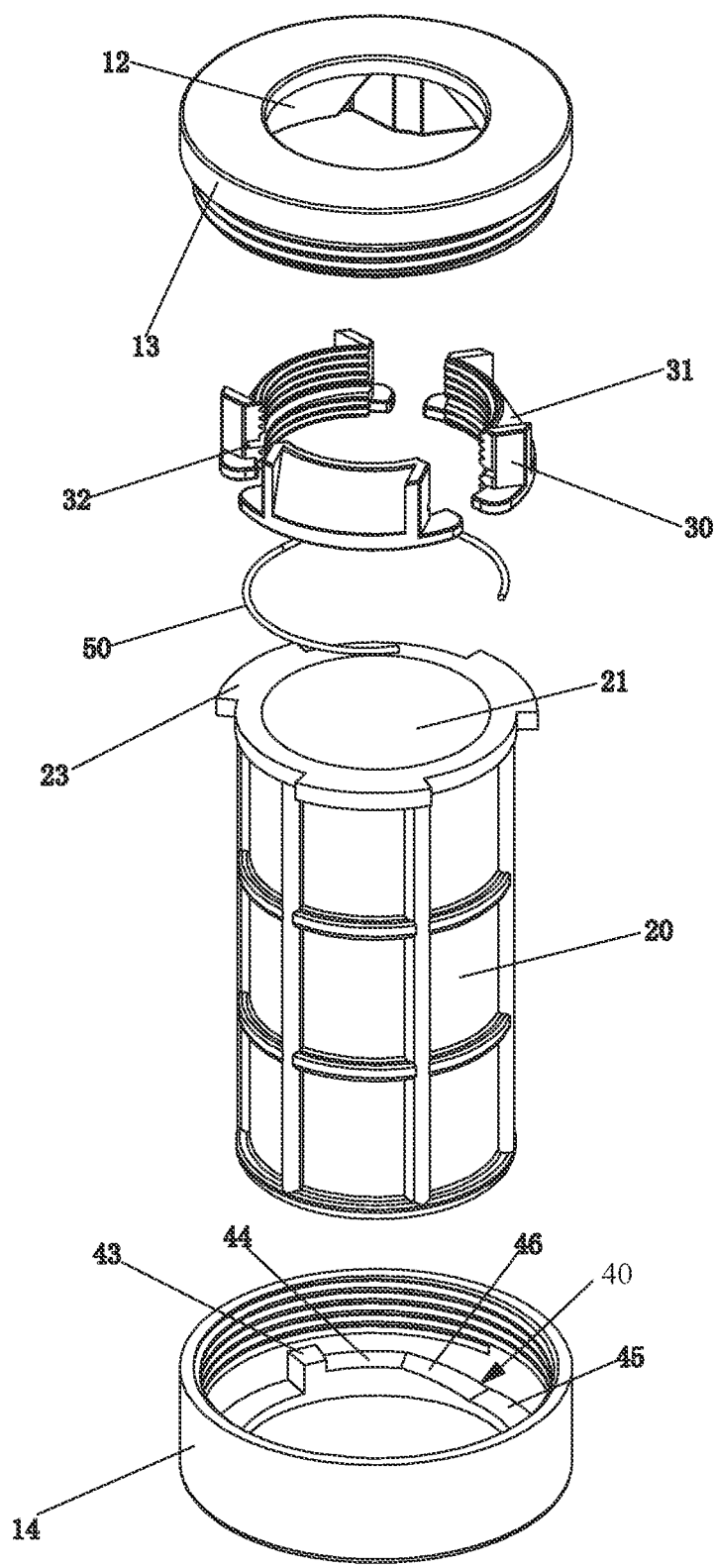
FIG. 6 illustrates an exploded perspective view of Embodiment 2.

Referring to FIG. 6, this embodiment discloses a mounting and dismounting nut structure.

This embodiment differs from Embodiment 1 in that the limiting member 40 is disposed in the activity chamber 11 and faces the three threaded blocks 30. The limiting member 40 is connected to the activity chamber 11 by integral molding, screwing, welding, clamping, sticking, etc., and is not limited thereto.

In this embodiment, the limiting member 40 comprises a limiting protrusion 43, a third limiting surface 44, and a fourth limiting surface 45 connected one-to-one (e.g., connected in series). The third limiting surface 44 is higher than the fourth limiting surface 45. The second body 20 comprises a second drive block 23 extending outward. When the second drive block 23 is connected to the fourth limiting surface 45, the second body 20 moves relative to the first body 10 in an axial direction of the second body 20. When the second body 20 rotates to enable the second drive block 23 to be connected to the third limiting surface 44, the three threaded blocks 30 are supported in an axial direction of the three threaded blocks 30, and the second body 20 continuously rotates to drive the second drive block 23 to abut the limiting protrusion 43 to enable the first body 10 and the three threaded blocks 30 to rotate concurrently.

In this embodiment, the limiting member 40 further comprises a transition surface 46 disposed between the third limiting surface 44 and the fourth limiting surface 45. The limiting member 40 is configured to be fixed relative to the first body 10.

When the mounting and dismounting nut structure is assembled to the threaded rod 1, the mounting and dismounting nut structure surrounds the outer side of the threaded rod 1, and the top surface of the first upper body 13 abuts the bottom surface of the countertop 2.

In an initial state, the second drive block 23 abuts the fourth limiting surface 45, and the three threaded blocks 30 are disposed at intervals.

The second body 20 is pushed upward to drive the three threaded blocks 30 to move upward and inward due to the action of the three first inclined surfaces 12 and the second inclined surfaces 31. When the second body 20 cannot continue to move upward, the second body 20 rotates to drive the second drive block 23 to pass through the transition surface 46 to be disposed on the third limiting surface 44, and the thread diameter of the three threaded blocks 30 is just the standard thread diameter.

The second body 20 continues to rotate. At this time, the second drive block 23 abuts the limiting protrusion 43, and the second drive block 23 cooperates with the limiting protrusion 43 to drive the first body 10 to rotate concurrently. The first body 10 drives the three threaded blocks 30 to rotate concurrently so that the three threaded blocks 30 are locked with the threaded rod 1.

When the mounting and dismounting nut structure is removed from the threaded rod 1, the second body 20 rotates in a reverse direction (e.g., counterclockwise), so that the second drive block 23 moves from the third limiting surface 44 to the fourth limiting surface 45 via the transition surface 46. At this time, the three threaded blocks 30 move downward and outward under the action of the first inclined surface 12 and the second inclined surface 31 to be unlocked from a locked state. At this time, the mounting and dismounting nut structure can be directly removed from the threaded rod 1.

Figure 7:
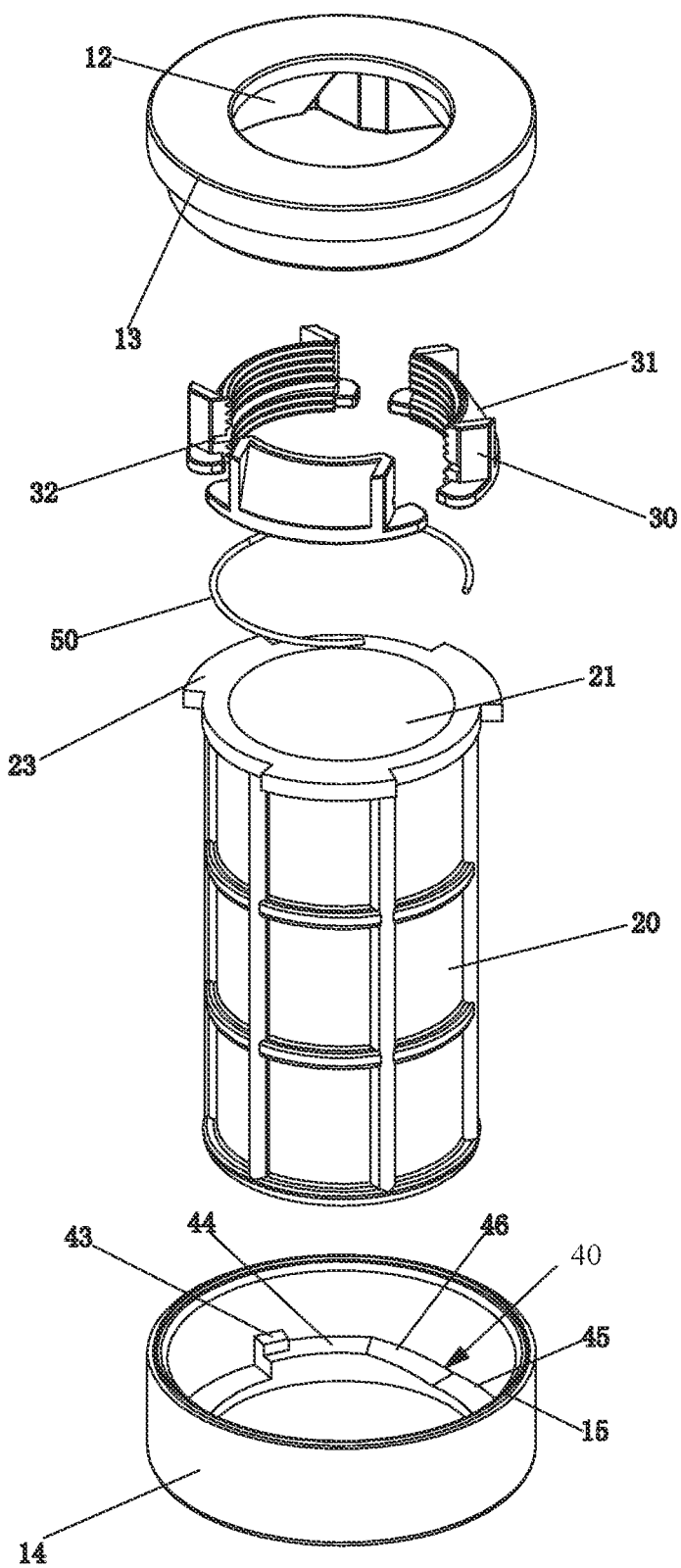
FIG. 7 illustrates an exploded perspective view of some embodiments showing that the first upper body is connected to a first lower body by welding.
Figure 8:
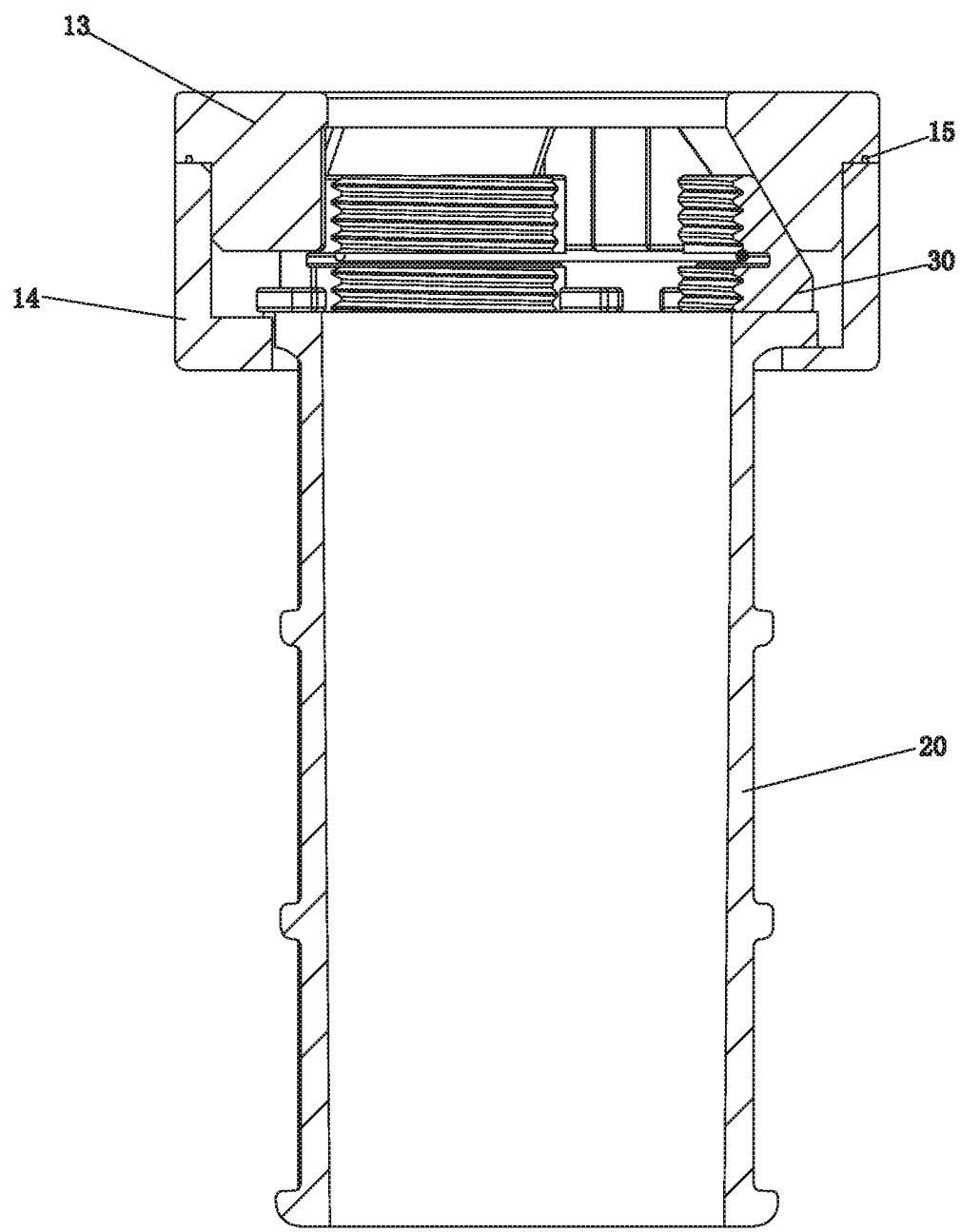
FIG. 8 illustrates a cross-sectional schematic view of some embodiments showing that the first upper body is connected to the first lower body by welding.

Referring to FIGS. 7 and 8, in some embodiments, the first upper body 13 is connected to the first lower body 14 by welding. In this embodiment, a top surface of the first lower body 14 comprises a convex ring 15 for welding.

Figure 9:
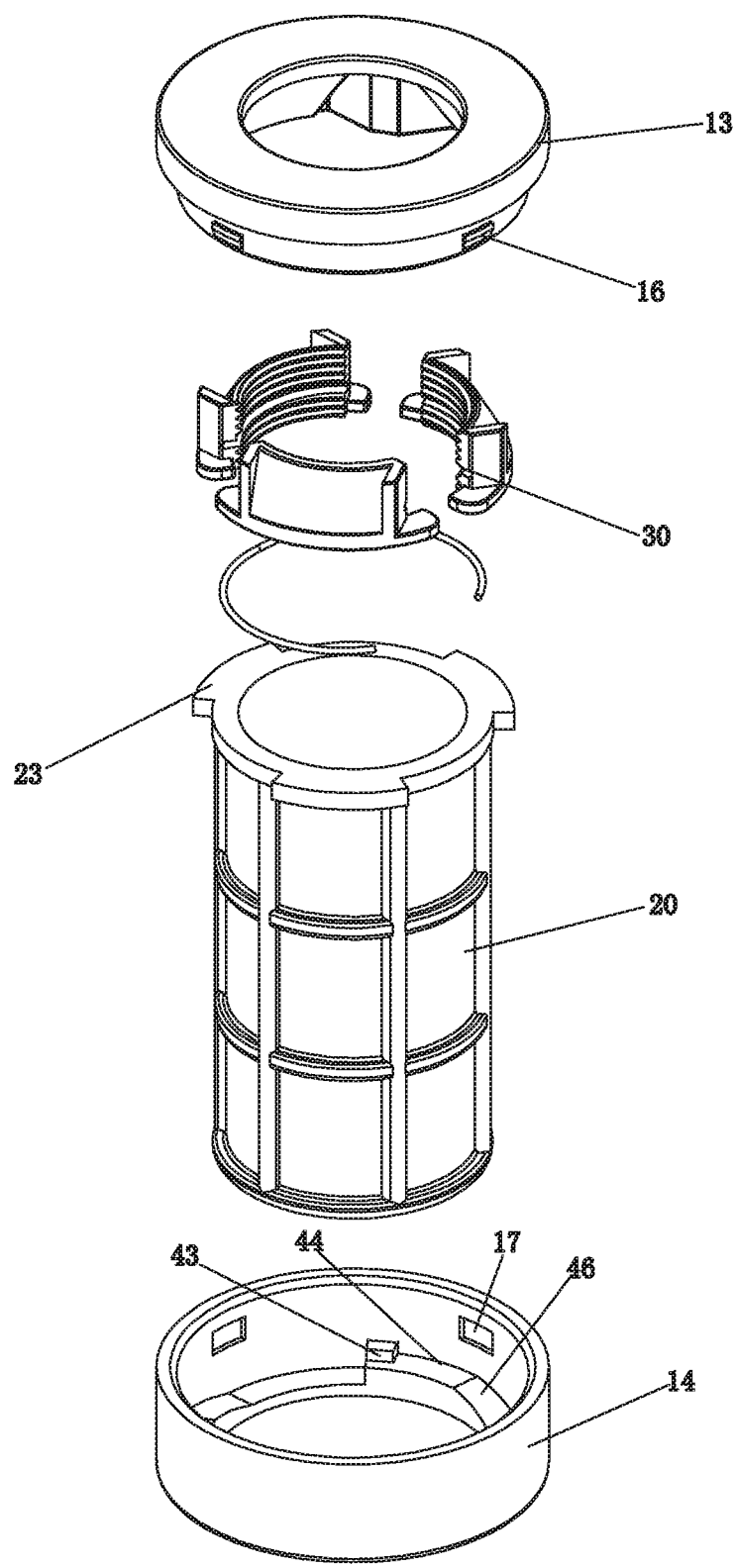
FIG. 9 illustrates an exploded perspective view of some embodiments showing that the first upper body is clamped to the first lower body.
Figure 10:
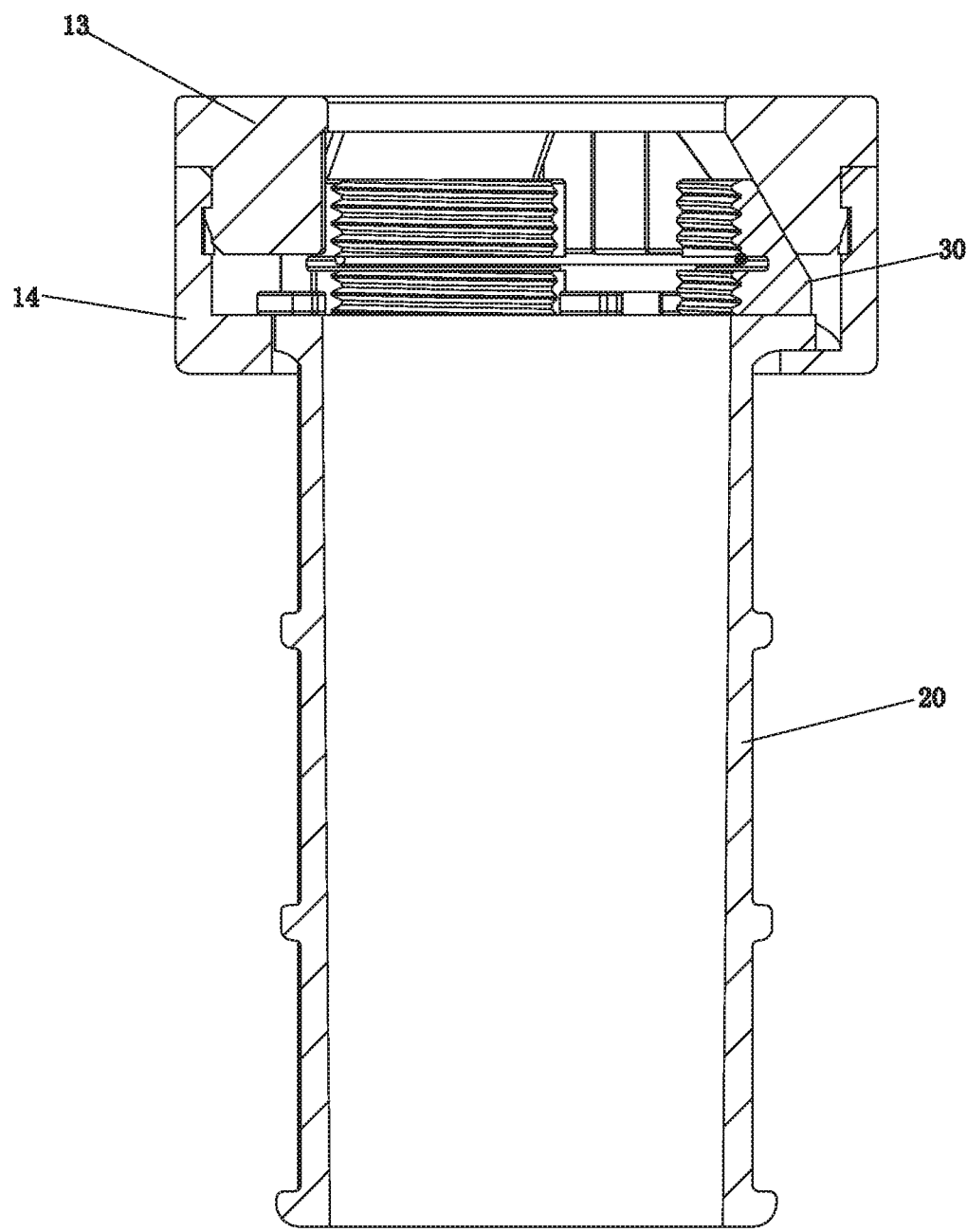
FIG. 10 illustrates a cross-sectional schematic view of some embodiments showing that the first upper body is clamped to the first lower body.

Refer to FIGS. 9 and 10, in some embodiments, the first upper body 13 is clamped to the first lower body 14. In this embodiment, an outer periphery of the first upper body 13 comprises a fastener, an inner periphery of the first lower body 14 comprises a clamping groove 17, and the first upper body 13 is connected to the first lower body 14 due to an engagement of the clamping groove 17 and the fastener 16.

Figure 11:
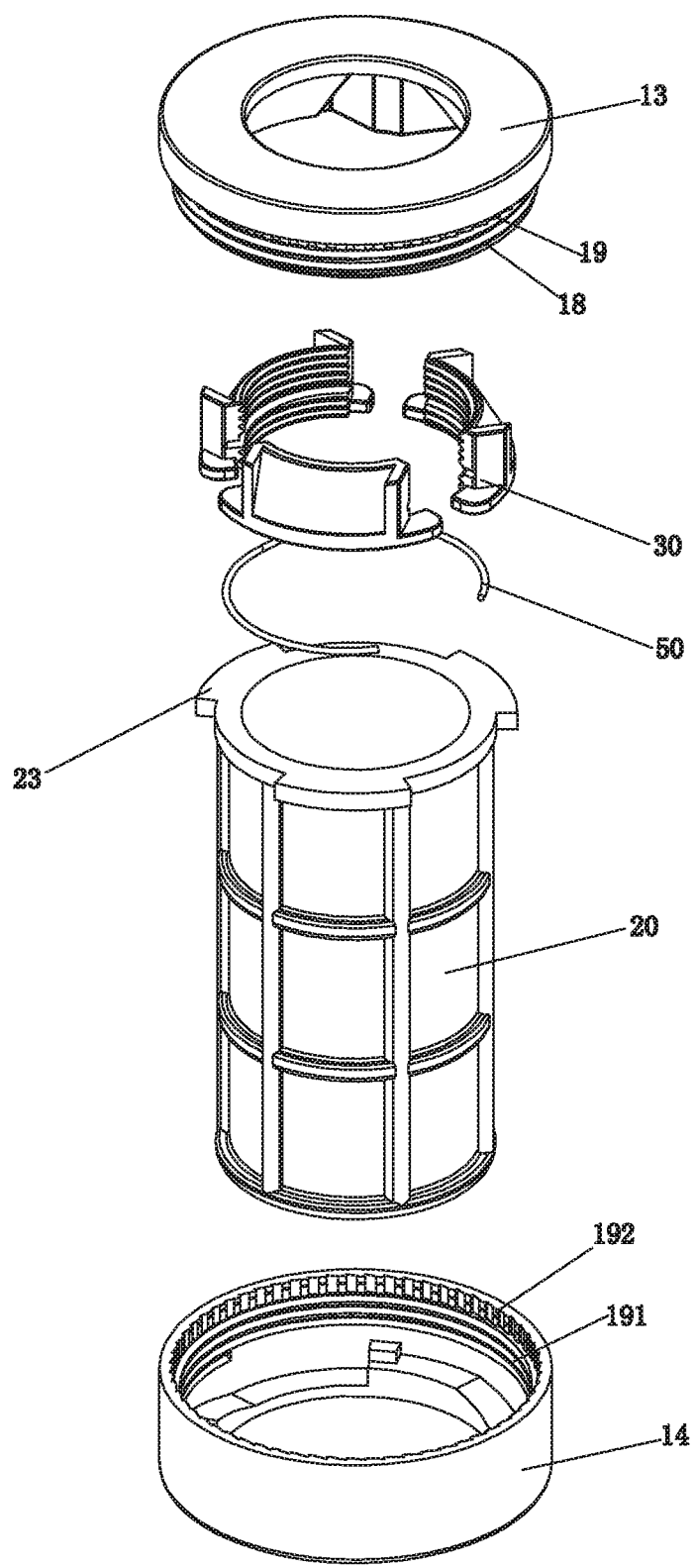
FIG. 11 illustrates an exploded schematic view of some embodiments showing that the first upper body is screwed to the first lower body with loosening protective teeth.

Please refer to FIG. 11, in some embodiments, the first upper body 13 is screwed to the first lower body 14 with loosening protective teeth (e.g., teeth configured to inhibit rotation or loosening). In this embodiment, an outer periphery of the first upper body 13 comprises an external thread 18 and a first loosening protective tooth 19 of the loosening protective teeth is disposed above the external thread 18. An inner periphery of the first lower body 14 comprises an internal thread 191 and a second loosening protective tooth 192 of the loosening protective teeth, and the second loosening protective tooth 192 is disposed above the internal thread 191.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. A mounting and dismounting nut structure configured to be screwed to a threaded rod, comprising:
   a first body comprising a first inclined surface,
   a second body configured to move relative to the first body and comprising a through hole,
   a plurality of threaded blocks, and
   a limiting member, wherein:
      inner walls of the plurality of threaded blocks comprise internal threads,
      outer walls of the plurality of threaded blocks comprise second inclined surfaces, and
      when the mounting and dismounting nut structure surrounds the threaded rod and is subjected to an external force from a top of the first body:
         the plurality of threaded blocks move toward a center axis of the plurality of threaded blocks due to a cooperation of the first inclined surface and the second inclined surfaces, and
         after the second body rotates relative to the first body to drive the limiting member to rotate to move toward the top of the first body, the limiting member is configured to be self-sustainingly positioned relative to the first body for providing axial support to the plurality of threaded blocks to be locked with the threaded rod.

2. The mounting and dismounting nut structure according to claim 1, wherein the limiting member is disposed below the plurality of threaded blocks.

3. The mounting and dismounting nut structure according to claim 2, wherein the limiting member is operatively connected to the second body or the first body.

4. The mounting and dismounting nut structure according to claim 3, wherein:
   the limiting member comprises a hollow sleeve ring,
   an inner wall of the hollow sleeve ring comprises a drive surface,
   the second body comprises a first drive block configured to be operatively connected to the drive surface,
   an inner wall of the first body is operatively connected to the hollow sleeve ring, and
   when the limiting member rotates and moves upward to a preset position, the limiting member drives the first body to rotate.

5. The mounting and dismounting nut structure according to claim 4, wherein:
   the inner wall of the hollow sleeve ring comprises a step surface,
   the step surface divides the inner wall of the hollow sleeve ring into a first inner wall and a second inner wall,
   a size of the first inner wall is larger than a size of the second inner wall,
   the first drive block is configured to move in the first inner wall in an axial direction of the first drive block,
   the first inner wall is the drive surface, and
   when the step surface abuts a bottom end surface of the first drive block, the hollow sleeve ring is configured to rotate to drive the first body to rotate.

6. The mounting and dismounting nut structure according to claim 5, wherein an outer wall of the hollow sleeve ring is operatively screwed to the inner wall of the first body.

7. The mounting and dismounting nut structure according to claim 4, wherein a limit on upward movement of the second body is the same as a limit on upward movement of the limiting member.

8. The mounting and dismounting nut structure according to claim 5, wherein the first body further comprises a second limiting surface configured to limit movement of the hollow sleeve ring in an axial direction of the hollow sleeve ring.

9. The mounting and dismounting nut structure according to claim 1, wherein:
   the first body comprises a first upper body and a first lower body connected to the first upper body,
   an activity chamber is disposed between the first upper body and the first lower body, the first inclined surface is disposed on an inner surface of the first upper body, and
   the limiting member is disposed below the first inclined surface.

10. The mounting and dismounting nut structure according to claim 9, wherein:
   the first upper body is connected to the first lower body by screwing, welding, sticking, clamping, or screwing with loosening protective teeth.

11. A mounting and dismounting nut structure configured to be screwed to a threaded rod, comprising:
   a first body comprising a first inclined surface,
   a second body configured to move relative to the first body and comprising a through hole and drive blocks,
   a plurality of threaded blocks, and
   a limiting member, wherein:
      inner walls of the plurality of threaded blocks comprise internal threads,
      outer walls of the plurality of threaded blocks comprise second inclined surfaces, and
      when the mounting and dismounting nut structure surrounds the threaded rod and is subjected to an external force from a top of the first body:
         the plurality of threaded blocks move toward a center axis of the plurality of threaded blocks due to a cooperation of the first inclined surface and the second inclined surfaces, and
         after the second body rotates relative to the first body to drive the drive blocks to move toward a top of the limiting member, the limiting member is configured to be self-sustainingly positioned relative to the first body for providing axial support to the plurality of threaded blocks to be locked with the threaded rod.

12. The mounting and dismounting nut structure according to claim 11, wherein the limiting member is disposed below the plurality of threaded blocks.

13. The mounting and dismounting nut structure according to claim 12, wherein the limiting member is operatively connected to the second body or the first body.

14. The mounting and dismounting nut structure according to claim 13, wherein:
   the first body further comprises an activity chamber,
   the limiting member is fixedly disposed in the activity chamber, and
   the limiting member faces the plurality of threaded blocks.

15. The mounting and dismounting nut structure according to claim 13, wherein:

the limiting member comprises a limiting protrusion, a third limiting surface, and a fourth limiting surface connected one-to-one, the third limiting surface is higher than the fourth limiting surface, the second body comprises a second drive block extending outward, when the second drive block is connected to the fourth limiting surface, the second body is configured to move relative to the first body in an axial direction of the second body, and when the second body rotates to enable the second drive block to be connected to the third limiting surface so as to support the plurality of threaded blocks in an axial direction of the second drive block, the second body continuously rotates to push the second drive block to abut the limiting protrusion to drive the first body and the plurality of threaded blocks to rotate concurrently.

16. The mounting and dismounting nut structure according to claim 15, wherein:

the limiting member further comprises a transition surface, and the transition surface is connected between the third limiting surface and the fourth limiting surface.

17. The mounting and dismounting nut structure according to claim 11, wherein:

the first body comprises a first upper body and a first lower body connected to the first upper body, an activity chamber is disposed between the first upper body and the first lower body, the first inclined surface is disposed on an inner surface of the first upper body, and the limiting member is disposed below the first inclined surface.

18. The mounting and dismounting nut structure according to claim 17, wherein:

the first upper body is connected to the first lower body by screwing, welding, sticking, clamping, or screwing with loosening protective teeth.

* * * * *